Nov. 19, 1935.  A. LAKE  2,021,512
TRUCK CLOSURE DEVICE
Filed Nov. 20, 1934
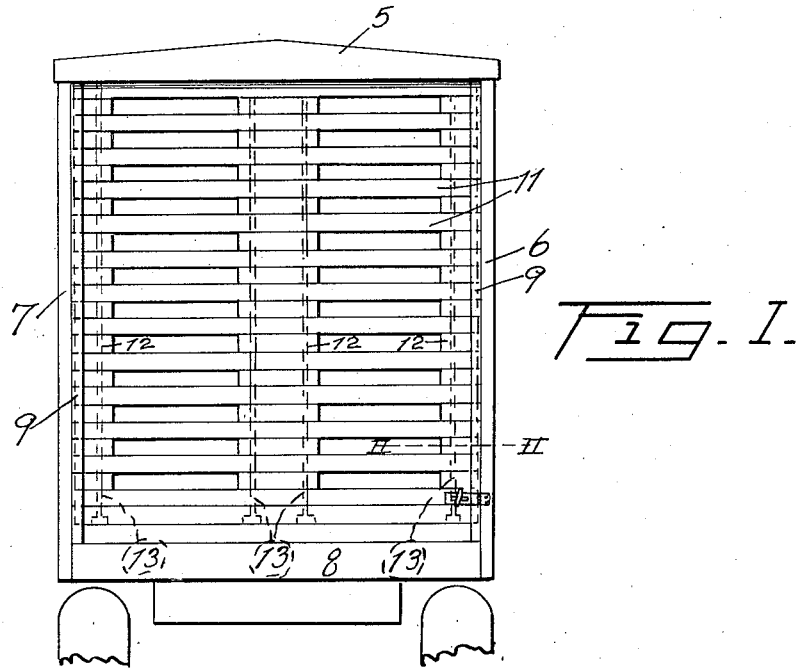
Fig. I.
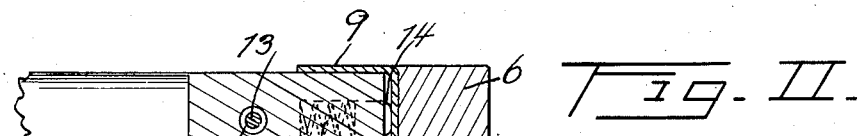
Fig. II.
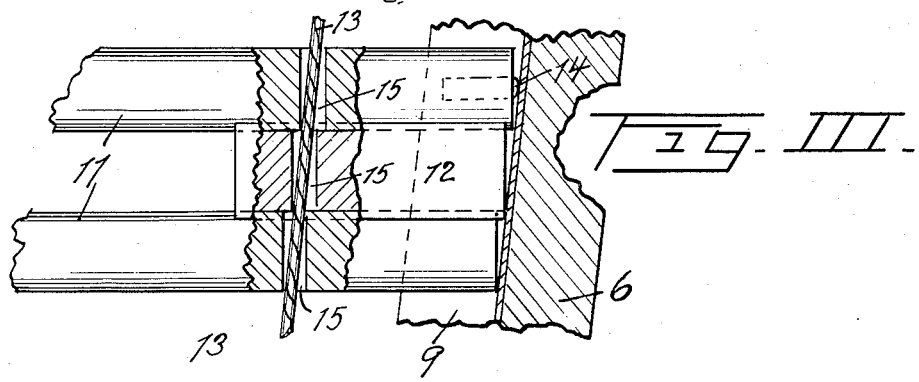
Fig. III.
INVENTOR.
ALBERT LAKE
BY
ATTORNEY.

Patented Nov. 19, 1935

2,021,512

UNITED STATES PATENT OFFICE 2,021,512

TRUCK CLOSURE DEVICE

Albert Lake, San Francisco, Calif., assignor to Haslett Warehouse Co., San Francisco, Calif., a corporation of California Application November 20, 1934, Serial No. 753,918

1 Claim. (Cl. 296—106)

This invention relates to improvements in trucks and like vehicles and has particular reference to a sliding closure for a truck.

The principal object is to provide a sliding closure for a truck which will occupy a minimum amount of space.

A further object is to produce a device which is entirely confined within the vehicle body in counter distinction to the customary tail gate, which when opened swings outwardly from the body.

Another object is to produce a device which will not jam irrespective of the amount of weaving action which takes place in the body.

A still further object is to produce a device which will be at all times held against undue rattling, squeaks and other objectionable noises.

Other objects and advantages will be apparent during the course of the following description.

In the accompanying drawing forming a part of this specification and in which like numerals are employed to designate like parts throughout the same, Fig. I is a rear view of a vehicle body having my invention applied thereto, Fig. II is an enlarged detail cross section on the line 2—2 of Fig. I, and Fig. III is an enlarged fragmentary detail view showing the manner in which the sliding closure may give with the weaving action of the body, the angle illustrated being somewhat exaggerated in order to bring out the principle involved.

The ordinary commercial vehicle such as warehouse trucks and the like ordinarily are equipped with hinged doors or with hinged grating and in most instances a horizontally pivoted tail gate, and with this construction a vehicle backing up to a loading platform, warehouse door, railway car door or any similar place, must first swing the door or grating open and drop the tail gate. This means stopping the vehicle, opening the grating or doors and then backing the vehicle in order to effect an easy loading. With my invention this difficulty has been eliminated by employing a vertically sliding closure which does not at any time extend beyond the outer margin of the vehicle body.

In the drawing I have merely illustrated the rear view of a truck having my sliding closure, and it might here be stated that this sliding closure may run upon tracks formed upon the top of the vehicle and counter-weighted with suitable counter-weights or with springs under tension or the same may roll upon a roller somewhat similar to the ordinary window shade roller. However, my invention limits itself to the mere fact that I have provided a flexible closure and, therefore, the manner of mounting is immaterial. My invention consists of the manner of fastening the various slats together so as to accomplish the desired result.

In the accompanying drawing wherein for the purpose of illustration is shown a preferred embodiment of my invention, the numeral 5 designates the top of a vehicle having side pieces 6 and 7 and a bottom cross piece 8. The construction thus far described is common to all vehicles. Along the side pieces 6 and 7 I have placed channels 9. These channels form tracks in which the ends of slats 11, forming my closure, move. Spacers 12 are placed between the slats 11 as best illustrated in Fig. I. In order to keep these slats and spacers in alignment with each other I pass therethrough cables 13, and it will be here noted that the openings through which the cables pass in the slats and spacers are of greater diameter than the diameter of the cables. These openings are shown at 15. The cables are attached at their upper ends to the take-up roller, counter-weights or springs as the case may be. In the ends of certain of the slats I place plungers 14 which are spring-pressed against the inner surface of the track 9, the spring being shown at 16. This arrangement prevents rattling which would otherwise occur, due to the fact that there must be no binding action in a device of this nature and in order to prevent binding the slats must be of less width than the width of the vehicle between the bottom of the tracks.

In Fig. III I have illustrated the manner in which the vehicle body may flex, which flexing would result in the slats 11 sliding upon the spacers 12 without causing any binding action of the slats in the tracks. It is this sliding action that causes my device to slide easily under the most adverse conditions, likely to be found in a vehicle which receives rough usage.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a device of the character described, the combination with a vehicle having upright parallel side pieces, each of said side pieces having a track secured thereto, a closure slidable in said track and including in its construction a plurality of slats having their ends spaced slightly from said tracks and parallel thereto, a plurality of alternate spacers interposed between said slats and having their outer ends in alignment with the ends of said slats when said closure is in normal position, each of said slats and said spacers having openings formed therethrough, the diameter of said openings being such that said openings will be in communication with each other when said slats and said spacers are moved laterally with respect to each other, a distance sufficient to permit weaving action of the sides of the vehicle, whereby a cable may pass through said openings without binding.

ALBERT LAKE.